US00RE37390B1

(19) United States
(12) Reissued Patent
Liao et al.

(10) Patent Number: US RE37,390 E
(45) Date of Reissued Patent: Sep. 25, 2001

(54) DEVICE FOR RELEASABLY ENGAGING A WHEEL AXLE OR OTHER TYPE OF MEMBER

(76) Inventors: Gordon Liao; Alex Cheng, both of P.O. Box 48-121, Taipei (TW)

( * ) Notice: This patent is subject to a terminal disclaimer.

(21) Appl. No.: 08/089,161

(22) Filed: Jul. 8, 1993

Related U.S. Patent Documents

Reissue of:
(64) Patent No.: 5,029,946
Issued: Jul. 9, 1991
Appl. No.: 07/561,593
Filed: Aug. 1, 1990

(51) Int. Cl.[7] ..... B60B 35/02
(52) U.S. Cl. ..... 301/111; 301/126
(58) Field of Search ..... 301/1, 111, 112, 301/114, 115, 121, 122, 124.1, 126, 131; 403/321, 325, 326, 327, 328

(56) References Cited

U.S. PATENT DOCUMENTS

| | | | | |
|---|---|---|---|---|
| 2,046,342 | * | 7/1936 | Muck et al. | 403/328 X |
| 2,630,020 | * | 3/1953 | Juy | 301/105 B |
| 3,174,800 | * | 3/1965 | Jennings | 403/328 X |
| 3,897,647 | * | 8/1975 | Black | 403/328 X |
| 3,980,409 | * | 9/1976 | Turner | 403/328 X |
| 4,477,121 | * | 10/1984 | Atkins | 301/112 |
| 4,504,167 | * | 3/1985 | Nakanishi | 403/325 |
| 4,679,862 | * | 7/1987 | Luo | 301/112 |
| 4,725,027 | * | 2/1988 | Bekanich | 403/328 X |
| 4,798,098 | * | 1/1989 | Keller et al. | 403/330 X |
| 4,936,598 | * | 6/1990 | Lee | 301/112 X |
| 4,978,175 | * | 12/1990 | Wu | 301/121 |
| 5,029,946 | * | 7/1991 | Liao | 301/111 |
| 5,281,044 | * | 1/1994 | Chen | 403/328 |

* cited by examiner

*Primary Examiner*—Russell D. Stormer

(57) ABSTRACT

A releasable wheel assembly for golf cart includes a bracket member attached to lower end of a leg member of a golf cart, a wheel set having a wheel rotatably mounting on an axle mechanism having an axle laterally extending into the bracket member and a locking member extending transversely into the bracket member and being slidably secured therein by means of a rivet for releasable engagement with the axle to secure the wheel set to the bracket.

19 Claims, 4 Drawing Sheets

DEVICE FOR RELEASABLY ENGAGING A WHEEL AXLE OR OTHER TYPE OF MEMBER

Matter enclosed in heavy brackets [ ] appears in the original patent but forms no part of this reissue specification; matter printed in italics indicates the additions made by reissue.

[BACKGROUND OF THE INVENTION] *FIELD OF APPLICATION*

The present invention relates to [an assembly for releasably attaching wheels to a golf cart] *a device for releasably engaging a member.*

*BACKGROUND OF THE INVENTION—DESCRIPTION OF THE PRIOR ART*

There are presently available [for use a wide variety of types of wheel assemblies for golf carts.] *many means for the releasable attachment of a member. Such means of attachment are frequently used to attach, for example, wheel sets to a golf cart.* As shown in FIGS. 1 to 3, a known golf cart wheel assembly includes a bracket 1 pivotally connected to lower end of a leg 2. The bracket 1 carries a sleeve 11 which defines a central passage extending transversely relative to the golf cart. A nut 12 is secured to a side wall of the sleeve 11 by means of welding and defines a screw passage inwardly communicating the central passage of the sleeve 11 through an opening (not shown) formed in the side wall of the sleeve 11. A wheel 3 rotatably mounting on a stub axle 31 which is formed with a recess 311 and inserted into the sleeve 11. Said stub axle 31 is secured in position within the sleeve 11 by means of a clamp screw 13 which extends through the nut 12 and opening in side wall of the sleeve 11 into the central passage with a protruding end thereof engaging the recess 311 of the axle. A coil spring 14 mounts between the clamp screw 13 and the nut 12 for facilitation of retracting the clamp screw 13.

The known wheel assembly resides on the following defects:

(1) For attachments of the sleeve 11 and nut 12 to the golf cart, welding is necessary that results being labor consuming and relatively expensive in manufacture of this wheel assembly; and (2) In mounting operation, it is time consuming that the clamp screw 13 should be threaded into the central passage of the sleeve 11 and correspondingly engaging the recess 311 of the axle 31.

SUMMARY OF THE INVENTION

It is therefore [a primary] *an* object of the present invention to provide an improved wheel assembly for a golf cart which can diminish the defects and disadvantages of a known wheel assembly.

It is another object of the present invention to provide [a wheel] *an* assembly for *use with, among other types of devices,* a golf cart with an improved construction that is easy in assembly and [cheap] *inexpensive* in manufacture.

[With the above objectives in view, a releasable wheel assembly for golf cart includes a bracket member attached to a lower end of a leg of a golf cart, a wheel set having a wheel rotatably mounting on an axle mechanism having an axle and laterally extending into the bracket member and a locking member extending trasversely into the bracket member and being slidably secured therein by means of a rivet for releasable engagement with the axle to secure the wheel set to the bracket.]

*In accordance with this invention, there is provided a releasable engaging device for engaging an engageable member. The device comprises housing means. In addition there is provided locking means coupled to and movable with respect to the housing. The locking means has at least one first aperture extending therethrough to receive the engageable member. The locking means is movable from at least first to a second position with respect to said housing. With the locking means in the first position, the engageable member is freely insertable in the first aperture. With the locking means in the second position the locking means engages the engageable member so as to hold the engageable member with respect to the housing. Resilient means are provided for resiliently urging the locking means from the first position to the second position.*

DETAILED DESCRIPTION OF THE PREFERRED EMBODIMENT

Figure 1:
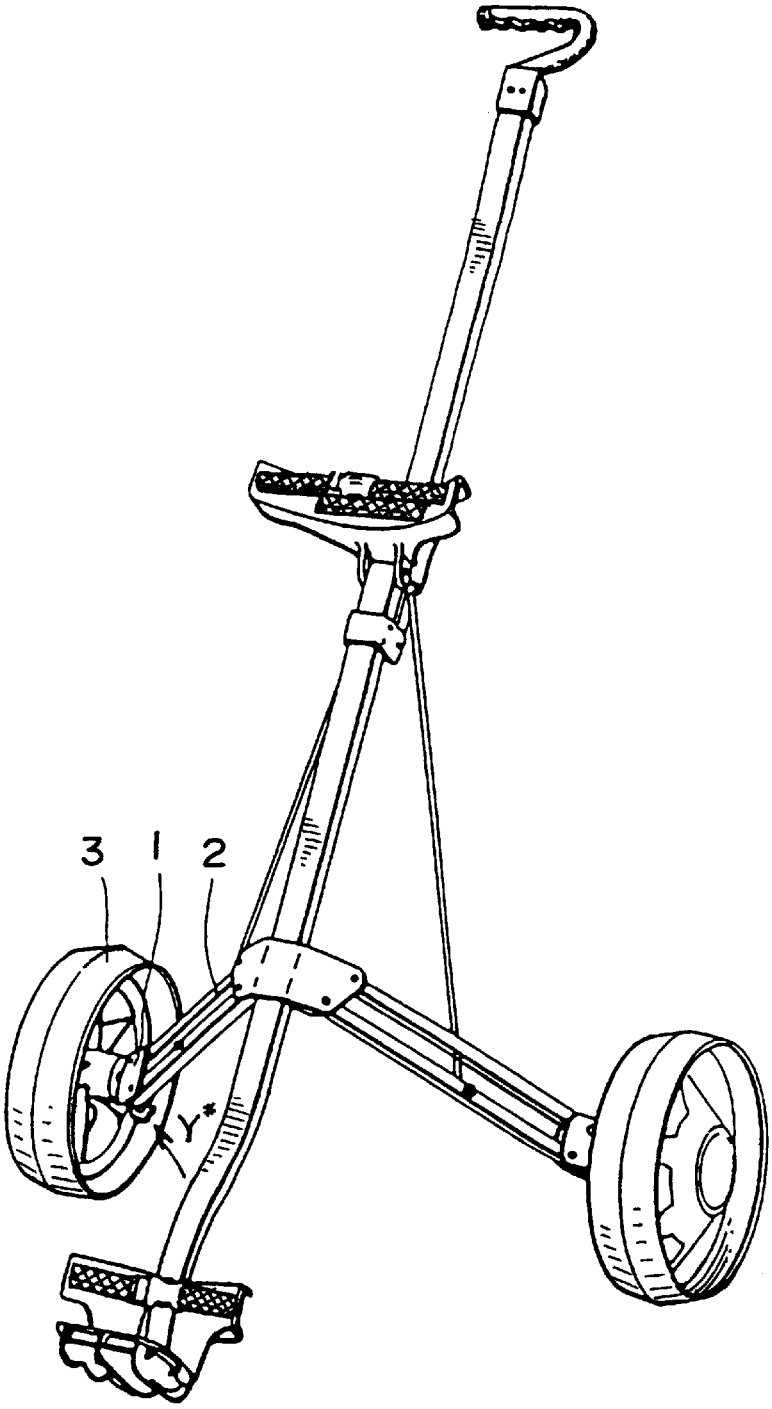
FIG. 1 (PRIOR ART)
FIG. 1 is a perspective view of a known golf cart.
Figure 2:
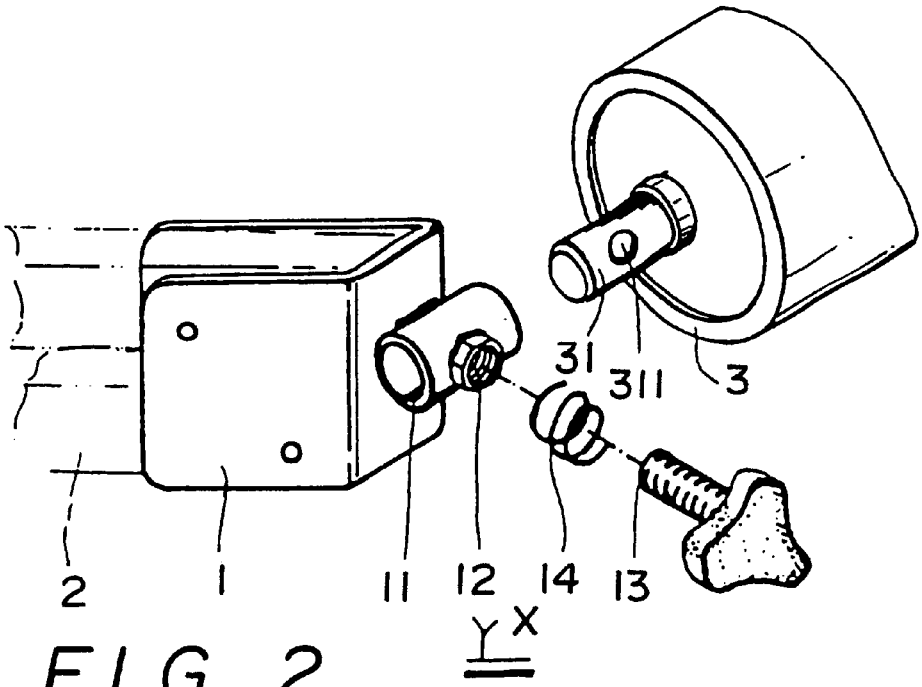
FIG. 2 (PRIOR ART)
FIG. 2 is a perspective and exploded view of a known wheel assembly for a golf cart.
Figure 3:
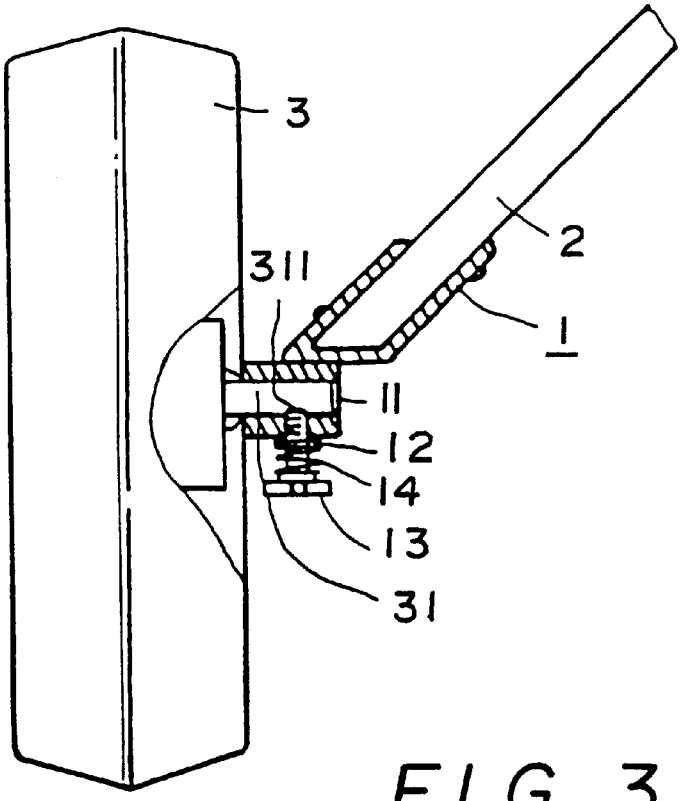
FIG. 3 (PRIOR ART)
FIG. 3 is a partially cross-sectional view of the known wheel assembly which is in assembled condition.
Figure 4:
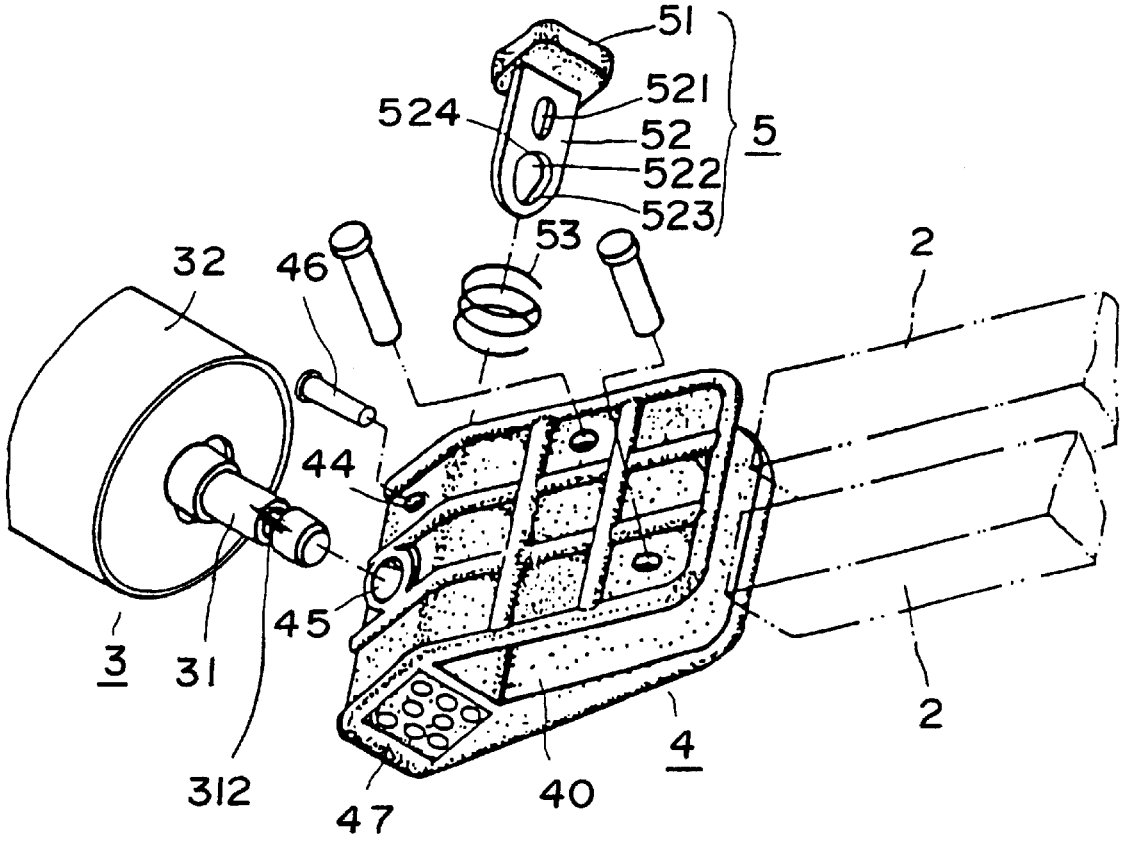
FIG. 4 is a perspective and exploded view of a preferred embodiment of a wheel assembly for golf cart according to the present invention.
Figure 5:
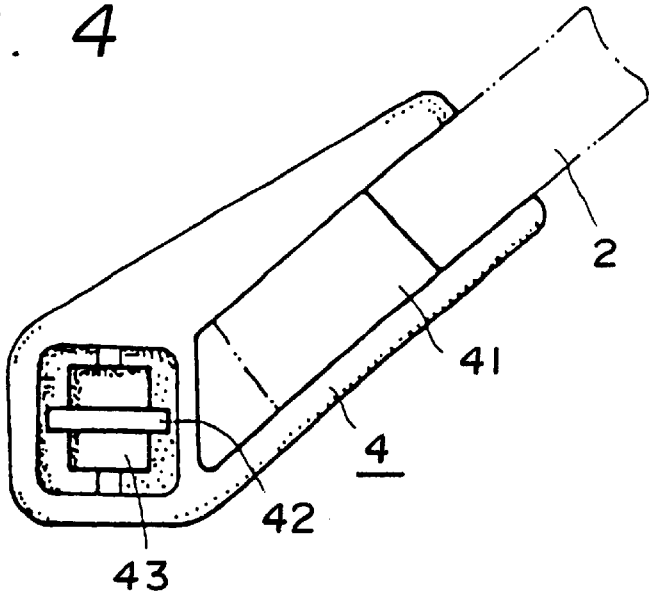
FIG. 5 is a side elevational view of the wheel assembly shown in FIG. 4 with a wheel removed.
Figure 6:
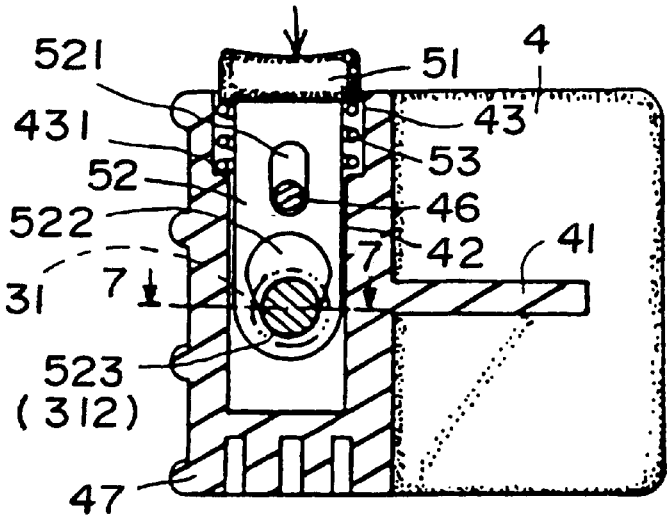
FIG. 6 is a transversely cross-sectional view of a bracket to be used in the wheel assembly of the present invention.

Referring now to FIGS. 4 to 6, *there is shown a releasable engaging device for engaging an engageable member. The releasable engaging device includes housing means, which may be, for example, a bracket 4, and an engageable member, such as an axle 31. The engageable member may be releasably engaged by means of locking means which may include, for example, a locking member 5, operatively connected to the bracket 4, as more fully discussed below. Thus, there is provided* a wheel assembly for a golf cart according to the present invention. *The releasable engaging device* includes [a] *housing or* bracket 4 formed with a mounting slot 40 which extends upwardly inwardly and is equally divided by a partition 41 for firmly receiving lower end portions of two parallel legs 2 by means of rivets, a wheel set 3 having a wheel 32 rotatably mounting on an axle mechanism which has [an] axle 31 circumferentially formed with [a] *an indentation or* groove 312 and extending axially outwardly and [a] locking member 5 extending transversely into [the] bracket 4 and being slidably secured therein by means of a rivet 46 *and forming together a releasable engagement device* for [releasably] *releasable* engagement with the axle 31 so as to secure the wheel set 3 to the bracket 4.

Said bracket, *or housing,* 4 has a lower solid portion 47 transversely formed with a passage 42 which has a recess 43 extending from one side of the solid portion 47 so as to form an outwardly facing annular shoulder 431 near its inner end. Bores 44, 45 are formed in a side wall of the bracket 4 to define passages inwardly communicating and perpendicular to the passage 42 for respectively receiving the axle 31 and *joining means such as pin-like* rivet 46 wherein at least the bore 44 extends through the solid portion 47.

The locking member 5 has a key 52 in the form of [a] *an elongated* plate formed with spaced *apertures or* slots 521, 522 and an enlargement*, head,* or flange 51 attached to outer *free* end of the key 52 for pressing the locking member 5 to move with a finger. *Apertures 521 and 522 are formed along a major axis of key 52.* The first slot 521 is *elongated and* dimensioned to allow a relative movement between the key 52 and rivet 46 along a longitudinal direction of the key 52 and the second slot 522 *is tear drop in circumferential configuration and* is dimensioned to allow the axle 31 passing through the key 52 from an outer side portion 524 of larger diameter and the groove 312 of the axle 31 being engaged by an inner side portion 523 of smaller diameter.

Figure 7:
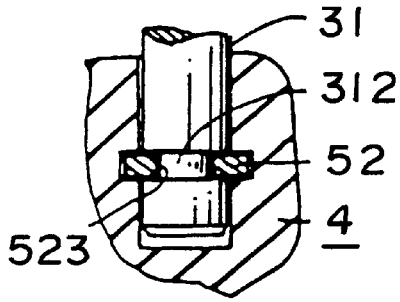
FIG. 7 is an enlarged and partially cross-sectional view taken along line a—a in FIG. 6.

In assembly, as best shown in FIG. 6, a *resilient* coil spring 53 is sleeved on the key 52 and accommodated in the recess 43, the key 52 of the locking member 5 is inserted into the passage 42 and slidably secured therein by means of the rivet 46 which extends through the bore *or passage* 44 of the bracket 4 and slot 521 of the key 52. The locking member 5 then can be pressed to locate the slot 522 in a position where the outer side portion 524 of the second slot 522 corresponds to the bores 45 and the wheel set 3 is secured to the bracket 4 by inserting the axle 31 thereof into bores 45 of the bracket member 4 and the slot 522 of the key 52. The axle 31 thus arranged is secured in position by the locking member 5 when the locking member 5 is released that allows the compressed coil spring 53, which is disposed between the shoulder 431 of the recess 43 and the flange 51 of the locking member 5, to bias the locking member 5 to move outwardly that resulting a firm engagement between the groove 312 of the axle 31 and the inner side 523 of the second slot 522, as best shown in FIGS. 6 & 7.

Figure 8:
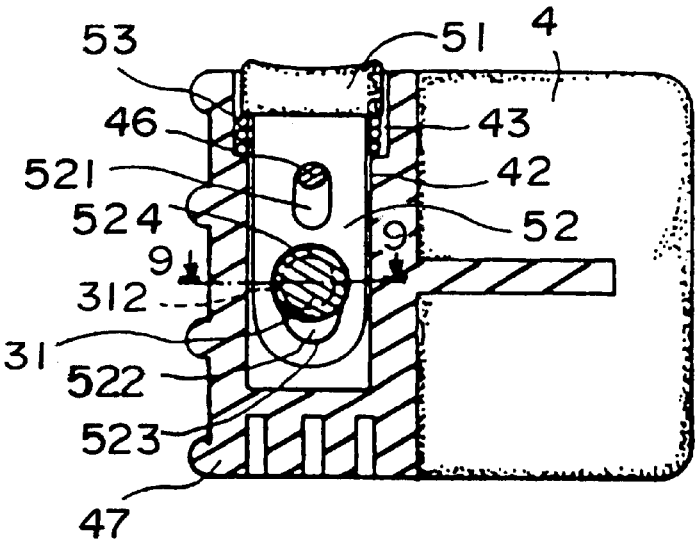
FIG. 8 is a transversely cross-sectional view of the bracket showing an axle in a state ready for removing the wheel.
Figure 9:
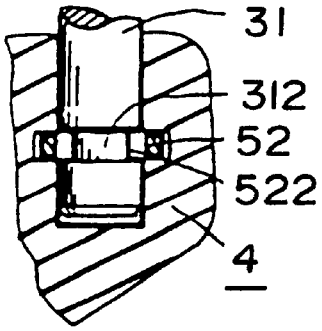
FIG. 9 is an enlarged and partially cross-sectional view taken along line b—b in FIG. 8.

In operation for removing the wheel set 3, as shown in FIGS. 8 and 9, the flange 51 is pressed with finger to overcome biasing force of the coil spring 53 and move the locking member 5 inwardly, the inner side 523 of the second slot 522 is disengaged from the groove 312 and the axle 31 is located within the outer side portion 524, the wheel set 3 can be removed by retracting axle 31 from the bracket 4. The rivet 46 serves as a guider for locating slot 522 of the key 52 of the locking member 5 in assembly and disassembly operations of the wheel set 3.

Various changes and modifications can be made in this construction without departing from the spirit of the invention. Such changes and modifications are contemplated by the inventor and he does not wish to be limited except by the scope of the appended claims.

What is claimed is:

1. A releasable wheel assembly comprising:

a bracket member having a solid end portion formed with a transverse passage extending from a side wall towards another side wall opposite to the side wall and first and second openings communicating and perpendicular to the transverse passage;

means for securing the bracket member to a lower end of a leg of a golf cart;

a wheel set including an axle formed with a circumferential groove and extending laterally into the [trasverse] *transverse* passage through the first opening of the bracket member and a wheel rotatably mounting on the axle;

a locking member having a plate member adapted to move in a telescopic fashion within the transverse passage including a movement range between a fist position and a second position and a flange member attached to an outer end of the plate member;

a first slot formed in the plate member and dimensioned to allow passing through of a rivet member, which extends through the first opening of the bracket member for securing the plate member of the locking member in the transverse passage and enabling the locking member to move with the movement range;

a second slot formed in the plate member and having a first side portion dimensioned to allow passing through of the axle through the second opening and a second side portion dimensioned to engage the groove of the axle, said first position of the plate member of the locking member locates the first side portion of the second slot corresponding to the second opening of the bracket member and said second position locates the second side portion of the second slot corresponding to the second opening of the bracket member.

2. A releasable wheel assembly as claimed in claim 1 wherein the bracket member has a mounting slot extending upwardly inwardly for receiving said lower end of the leg of the golf cart.

3. A releasable wheel assembly as claimed in claim 1 wherein the transverse passage in the solid portion of the bracket member has a recess extending from one side of the solid portion so as to form an outwardly facing annular shoulder for accommodating a coil spring between the annular shoulder and the flange of the locking member with a biasing force of the coil spring tending to move the plate member of the locking member from the first position into second position.

*4. A releasable engaging device for engaging en engageable member comprising:*

*a) housing means;*

*b) locking means coupled to and movable within said housing means; said locking means having a first aperture extending therethrough; said aperture of said locking means being within said housing for receiving therethrough the engageable member; said locking means being movable between a first and a second position with respect to said housing; with said locking means in said first position the engageable member being freely insertable in said first aperture; with said locking means in said second position said locking means engages the engageable member so as to hold the member with respect to said housing;*

*c) said locking means have a second aperture extending therethrough;*

*d) joining means, secured to said housing means, for extending through said second aperture so as to retain said locking means slidably within said housing; and*

*e) resilient means for resiliently urging said locking means from said first position to said second position.*

*5. The device of claim 4 wherein said housing means having a first passage for receiving the engageable member therein; said first passage intersecting said first aperture.*

*6. The device of claim 5 wherein said housing means having a second passage; said locking means being movable within said second passage.*

*7. The device of claim 6 wherein said locking means comprises a locking member slidable within said second passage from between said first position and said second position; said locking member having a free end thereof*

*accessible from outside of said housing means so that the engageable member may be manually moved between said first and second positions.*

*8. The device of claim 7 wherein said resilient means engages said housing and said locking member so as to urge said locking member into said second position.*

*9. The device of claim 8 wherein said resilient means comprises a spring.*

*10. The device of claim 9 wherein said spring is a coiled spring, about said locking member, and within said second passage.*

*11. The device of claim 10 wherein said joining means comprises a pin-like member secured to said housing means, passing through said second passage and said second aperture to hold said locking member within said second passage.*

*12. The device of claim 11 wherein said locking member comprises means for retaining said spring within said second passage.*

*13. The device of claim 12 wherein the engageable member having an indentation for receiving said locking member to thereby lock the engageable member to said housing.*

*14. The device of claim 4 wherein the engageable member having an indentation for receiving said locking means to thereby lock the engageable member to said housing.*

*15. The device of claim 13 wherein said first aperture is substantially tear-shaped so that, with said locking member in said first position, the engageable member passes easily through the larger portion of said tear-shaped first aperture and, with said locking member moving into said second position, the narrower portion of said tear-shaped first aperture engaging said indentation to engage said indentation.*

*16. The device of claim 14 wherein said first aperture is substantially tear-shaped so that, with said locking means in said first position, the engageable member passes easily through he larger portion of said tear-shaped first aperture and, with said locking member moving into said second position, the narrower portion of said tear-shaped first aperture engaging said indentation to engage said indentation.*

*17. The device of claim 15 wherein said second aperture is elongated so that said pin-like member guides said locking member movement between said first and second position.*

*18. The device of claim 17 wherein said housing means comprises a housing; said locking member is elongated with said first and second apertures being arranged along said locking member major axis with said second aperture disposed between said first aperture and said free end of said locking member; said locking member being held movably within by at least a part of said second passageway; said free end having a head; said second passageway having a shoulder; said spring being about said locking member and resting upon said shoulder; the opposed end of said spring engaging said head to urge said locking member outwardly such that to remove the engageable member from said housing said locking member is manually depressed, removing said first aperture engagement of said indentation to thereby permit removal of the engageable member from said housing.*

*19. The device of claim 18 wherein the engageable member is cylindrical and said indentation is a circumferential groove.*

* * * * *